United States Patent Office 3,523,628
Patented Aug. 11, 1970

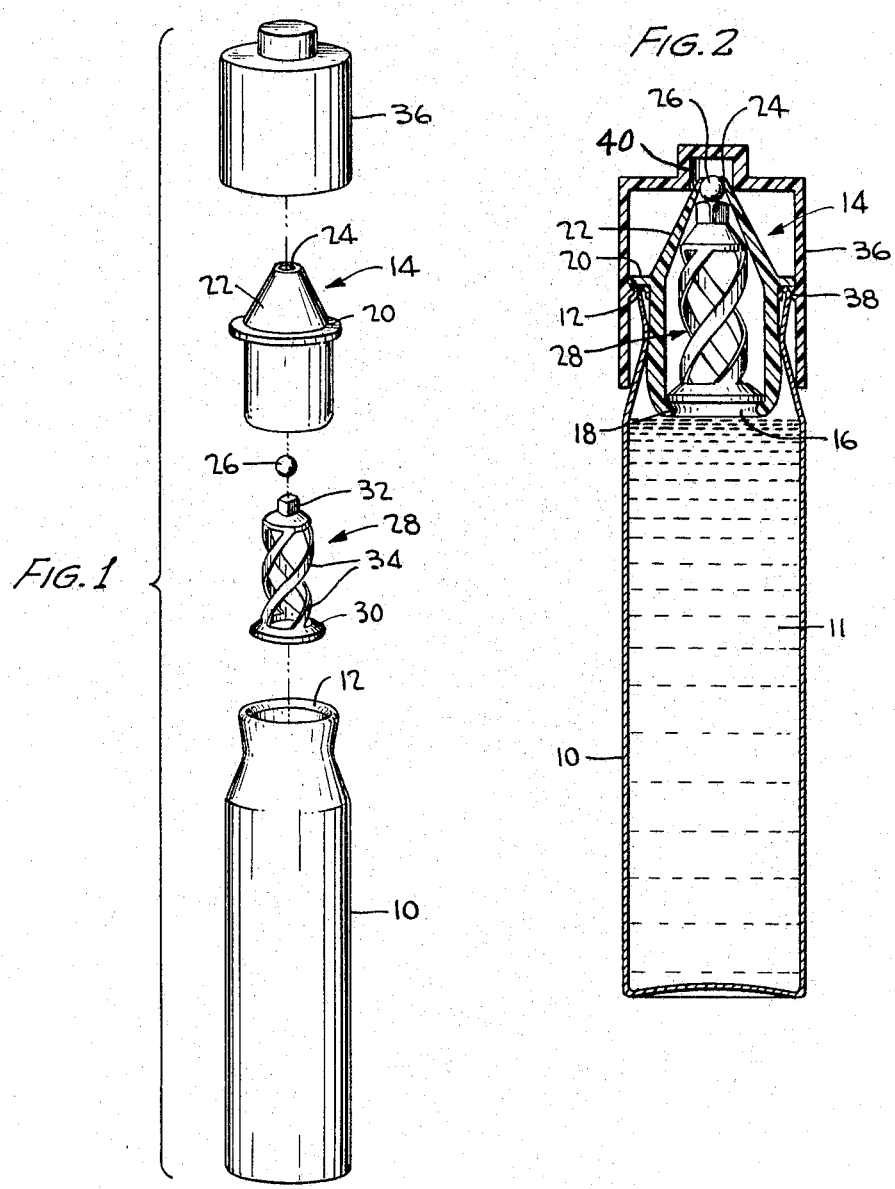

3,523,628
CONTAINER FOR CYANOACRYLATE ADHESIVE
Roger D. Colvin, deceased, late of Hartford, Conn., by Lee B. Colvin, administratrix, Hartford, Conn.; John B. Duffy, New Haven, Conn., and Ross G. Wittemann, Isla Verde, Puerto Rico, assignors to Loctite Corporation, Newington, Conn., a corporation of Connecticut
Filed Jan. 18, 1968, Ser. No. 698,869
Int. Cl. B65d 35/08
U.S. Cl. 222—107                     14 Claims

ABSTRACT OF THE DISCLOSURE

A container for cyanoacrylate ester adhesives designed to minimize deterioration of contents and afford long shelf stability, including a container body constructed of an air-impermeable material, preferably a metal such as aluminum, and a dispensing nozzle having at least the dispensing surfaces thereof formed of a thermoplastic resin having low surface free energy.

BACKGROUND OF THE INVENTION

It is known in the art that cyanoacrylate esters have valuable adhesive properties and exhibit unique characteristics in a number of respects for this purpose. Thus, they can be formulated without the addition of other active components into highly effective compositions which are capable of hardening, i.e., curing, in an extremely short time. As a result, they offer the advantages of short bonding time and ease of use over most available adhesive compositions which either require considerable time to acquire high bonding strength by reason of an inherently slow curing rate or of the necessity for evaporation of a solvent, or are inconvenient to use by virtue of the requirement that two or more components be mixed together at the time of use to produce an operative material. A unitary adhesive composition which sets up in a few minutes without the admixture of catalysts, hardeners, or other additives is rare in the art and the cyanoacrylate esters will, consequently, be seen as representing a potentially important advance in the field.

Unfortunately, the realization of this potential has been impeded by the discovery of certain practical difficulties accompanying the use of these new esters. Thus, cyanoacrylate ester adhesives compounded and sold for the consumer market have been found prone to undergo premature hardening within the container, resulting in a limited shelf life, which was most objectionable to the purchaser. Through careful investigation this tendency to premature hardening has been traced to an extreme sensitivity of this class of compounds to initiation of polymerization due to exposure to any of several different kinds of contamination.

Adhesive products for the consumer market are typically sold in flexible containers or tubes formed of a thermoplastic polymer, usually polyethylene or the like. It has been found that containers of such materials while impervious to liquids pervious to sufficient quantities of air and atmospheric moisture as to cause reaction of the contents within as short a storage time as two to three months even when stored under amibent conditions of temperature and humidity.

Again, most conventional adhesive containers are furnished with a dispensing nozzle or at least some manner of opening through which the contents are ejected by squeezing the container body. When the container body is released and returns to its normal shape, sub-atmospheric pressure is created within the container and the portion of the contents filling the dispensing nozzle or other opening is drawn backwardly into the container interior and mixed with the remainder of the contents. In this manner, material which has undergone sufficient exposure to contaminants in the air while within the dispensing opening as to initiate partial curing, is contacted with the uncontaminated product, leading to problems of stability with the entire unused contents. Even with dispensing containers of the type which are inverted to permit the contents to flow from the container mouth by gravity rather than by positive extrusion so as to avoid any vacuum effect, the difficulty is not eliminated, since the part of the product which was adjacent the mouth and hence exposed to the air runs back into the interior once the container is returned to upright position.

Finally, virtually all consumer-type adhesives are subject to the formation of deposits of hardened material in, on, and around the opening of the container therefor. Because of their very quick hardening action, cyanoacrylate ester adhesives are peculiarly suceptible to this problem. Thus, a difficulty which is objectionable but tolerable for other products, since such deposits form only slowly, becomes acute for the compositions with which this invention is concerned.

From the aforegoing discussion, it will be apparent that a container of cyanoacrylate ester adhesive which was not subject to these problems would be a significant advance in the art and would permit for the first time the full commercial realization of the potential benefits afforded by these otherwise highly useful adhesive compositions.

THE INVENTION

The invention is concerned with the combination of a 2-alkylcyanoacrylate-containing adhesive composition and a container uniquely adapted to hold such a composition and comprising a hollow container body substantially impermeable to air and moisture and which includes a dispensing opening preferably of the self-sealing type, the surfaces of the body adjacent said opening and contacted by the part of the contents being dispensed through the opening being formed of a thermoplastic resin characterized by a low surface free energy. Preferably, the dispensing opening is provided in a separately formed dispensing head which fits in an open end of the container body. The entire dispensing head can be conveniently constructed of the thermoplastic resin, or the resin can be applied as a superficial coating. Containers of adhesive according to this invention have been found to have a substantially increased shelf life compared to the same adhesive contained by containers of the kinds heretofore employed in the prior art.

BRIEF DESCRIPTION OF THE DRAWING

The attached drawing illustrates a typical practical application of the concepts of the invention within the context of a container of the type having a conver tional ball seal applicator and an accompanying cap.

DESCRIPTION OF THE INVENTION AND ITS PREFERRED EMBODIMENTS

Referring more particularly to the figures of the attached drawing, the illustrative embodiment of the invention shown therein comprises a generally cylindrical hollow container body 10 substantially filled with the cyanoacrylate ester adhesive composition indicated at 11. Body 10 has an open upper end 12 in which is inserted in a press fitted relation a dispensing head generally designated 14. The head 14 is a tubular collar-like structure open at its lower end at 16 which is situated within body 10, with an inwardly-projected bead 18 formed on lower end 16 for a purpose to be described. Approximately midway of the length of head 14 is an exterior flange 20 which is adapted to engage the upper edge of body opening 12 and hold head 14 in proper position relative to body 10. The upper section 22 of head 14 above flange 20 is of tapered or conical configuration to form a nozzle and terminates in a small opening 24 which constitutes the dispensing opening of the assembled container.

A conventional ball seal or valve is disposed within head 14 consisting of a ball 26 of a diameter slightly exceeding the minimum diameter of dispensing opening 24 so as to seal against the margins of that opening to close the same, and a unitary longitudinally compressible coil spring unit 28 including an annular base 30 engaging the bead 18, a thrust pad 32 at the upper end to contact ball 26, and an array of vertically winding spring coils 34 which are yieldable or compressible in a longitudinal direction. The relaxed length of spring unit 28 is somewhat greater than the distance between the internal edge of bead 18 and the lowermost point of ball 26 in seated position and the effect of unit 28 when in operative position is to bias ball 26 into seated position closing opening 24.

An overcap 36 is included which covers the exposed section of head 14, a shallow internal bead 38 engaging the periphery of flange to hold the overcap in place. Cap 36 may include a short extension 40 of reduced diameter to receive the tip of the dispensing head and minimize contact between the ball 26 and directly proximate surfaces with air when the cap is in place. The interior dimensions of extension 40 can be selected to seal against the tip of nozzle 22 if desired.

The container body 10 may be constructed of any air or vapor impermeable material, most common examples of which are various metals, such as aluminum, copper, steel, and numerous alloys. Other air or vapor impermeable materials can, of course, be substituted, such as glass or other ceramics. In the illustrated embodiment, the body 10 is formed of aluminum drawn or spun into the shape indicated. Synthetic resins can be employed as the container material or as a coating on the internal surfaces of a container formed of some other material provided the resin is selected to satisfy the critical requirements of this invention as regards permeability and inertness with respect to the cyanoacrylate resins. Concerning the latter, the polymerization of cyanoacrylate resins is activated in the presence of cationic material; consequently, the internal surfaces of the container which are liable to come in contact with the adhesive composition, whether formed of synthetic resins or otherwise, must be free of basic substances to avoid initiation of polymerization of the resin within the container.

An important distinguishing feature of the present invention resides in the provision on the container of the invention of dispensing surfaces of a polymeric thermoplastic resin characterized by a low surface free energy. After careful research, it has been found that resins having this property contribute the unexpected result of inhibiting the cyanoacrylate ester against undergoing significant polymerization on or about these surfaces during or following dispensing of the resin under normal conditions of use. The precise mechanism of physical chemistry which produces this result is quite complicated and difficult to fully explain. It appears that the cyanoacrylate resins are acutely sensitive materials and are liable to activation in the presence of high surface energy materials.

Interestingly enough, the air- or vapor-impervious materials identified above as suitable for construction of the container body are not as a class acceptable for use as the dispensing surfaces, although specific materials of this class may, of course, be found to meet the requirements of both functions. This apparent inconsistency is explained by the difference in reaction conditions obtaining at the two locations. Given the air-impervious nature of the container body, the collective effect of conditions favoring activation of the resin at the surface of the interior walls is apparently not sufficiently great as to require any inhibiting effect as provided on the dispensing surfaces through the low surface energy resins, whereas the converse is true at the dispensing surfaces themselves.

Surface free energy is a fairly rescently explored, but now well known, physical property of solids as well as liquids and is related in at least some manner with critical surface tension. Techniques for determining definite values of the property for specific materials by calculation as well as by indirect methods are known in the art, and data has been published for a variety of different materials. See for example the discussion appearing in Swartz, Perry and Berch, Surface Active Agents and Detergents, vol. II, 1958, Interscience Publishers, New York, N.Y., and the sources identified therein. The upper limit of the quantum of surface free energy that has been found permissible for purposes of the present invention is about 35 dynes per cm. and preferably somewhat less than that value, say, about 30 dynes per cm.

As used herein, the term "dispensing surfaces" is intended to refer to those surfaces which are adjacent the dispensing opening of the assembled container and are liable to come into contact with the adhesive composition during its egress from the container through such opening. For example, in the case of a dispenser of the type shown in the drawing, the "dispensing surfaces" would be the annular internal and external surfaces of the nozzle section 22 adjacent or proximate to the dispensing opening 24 together with the surface of ball valve 26. In effect, the dispensing surfaces may be understood as those surfaces lying in the region of the "interface" between the ambient atmosphere and the adhesive composition during discharge of the latter such as to be in effective contact with the composition while the composition is in effective contact with the ambient atmosphere. Preferable, the dispensing head as a whole is designed with surfaces having the requisite property of the invention and, as will be obvious, the entire body of the head can be formed of the thermoplastic resin where more convenient to construction and the nature of the resin admits.

Without limiting the scope of the invention, preferred thermoplastic resins which have been found to have the requisite property of the invention are the halogenated hydrocarbon polymers, especially where the halogen is fluorine, such as polyhexafluoropropylene, polytetrafluoropropylene, polyvinyl fluoride, and polyvinylidene fluoride. Copolymers of ethylene with polymers of the type just named can also be used with excellent results.

It is hardly necessary to explain that the design and construction of the specific container selected for any particular product, apart from the hereinbefore specified requirements, is not a limiting factor in the practice of the invention and may be varied widely as the circumstances suggest or demand. The exact structure shown for purposes of illustration can be considered as representing a preferred embodiment, since it has been found to give quite satisfactory results under actual working conditions. The characteristic of a ball-type applicator of laying down a thin, uniform layer of the material dispensed is peculiarly beneficial in giving optimum results with cyanoacrylate adhesives and is preferred for that reason, but this circumstance is a function of the adhesive and has no essential relation to the inventive concept here.

Adhesive compositions based on or containing cyanoacrylate resins as the essential adhesion-producing component are not novel to this invention but are well known as such in the art. Consequently, the formulation of the compositions utilized in this invention is not a part of the present inventive contribution and a detailed description of these compositions is believed unnecessary for purposes of this specification. Reference may be had, inter alia, to U.S. Pat. 2,816,093, issued Dec. 10, 1957, and U.S. Pat. 3,178,379, issued Apr. 13, 1965, as well as the patents and applications identified therein, for a more complete disclosure of these materials. Briefly and in general, they contain as the essential component a significant proportion of a polymerizable α-cyanoacrylate monomer of the formula $$CH_2=C-C-OR$$
$$\phantom{CH_2=C-}|\phantom{-}\|$$
$$\phantom{CH_2=C-}CN\phantom{-}O$$

where R is a hydrocarbon radical containing from about 1–16 carbon atoms, such as an alkyl, alkenyl, cyclohexyl and phenyl radicals. Lower alkyl radicals having, say, up to about 5 carbons are preferred by reason of their simplicity, especially methyl.

As is well known in the art, additives of various types can be present in the compositions in question to provide such properties or to serve certain functions that are desirable under particular circumstances. These additives can include, inter alia, thickening agents; i.e., viscosity-regulating agents, plasticizing agents, and polymerization inhibitors, such as sulfur dioxide and hydroquinone. Thus, where the appended claims recite a cyanoacrylate adhesive composition or equivalent terminology, it is to be understood that any of the compositions of this type which disclosed or suggested by the available art and subsequent improvements thereto are comprehended, whether or not conventional additives or adjuvants are included.

It will have already been understood that the embodiments of the invention used to illustrate and explain the practice of the invention are offered by way of example without intending to restrict the scope of the invention. Similarly, certain variations and modifications have been mentioned in the course of the description and others will certainly be suggested to the skilled worker without deviating from the broad scope of the invention.

Having thus described the invention, that which is claimed is:

1. A container at least partially filled with a cyanoacrylate adhesive composition, said container comprising a hollow body formed of a substantially gas-impermeable material receiving said composition in its interior and having a dispensing opening therein through which said composition passes in leaving said container, at least the dispensing surfaces of said container adjacent said opening being comprised of a thermoplastic polymeric resin having a surface free energy which does not exceed about 35 dynes per cm.

2. The combination of claim 1, wherein said surface free energy does not exceed about 30 dynes per cm.

3. The combination of claim 1, wherein said container includes valve means biased to close said dispensing opening, at least the surfaces of said valve means being also formed of said low surface free energy resin.

4. The container of claim 3 wherein the container comprises a hollow metal body, and the valve comprises a ball seal, said ball being slightly larger than, and biased interiorly of, said dispensing opening.

5. The combination of claim 1, wherein said container-forming material is free of basic substances adapted to catalyze the polymerization of said cyanoacrylate.

6. The combination of claim 5, wherein said container is formed of a metal inert with respect to said cyanoacrylate adhesive composition.

7. The combination of claim 1, wherein said container body has an opening in one wall thereof and includes a dispensing head fitted within said opening, said dispensing head defining a nozzle terminating in said dispensing opening.

8. The combination of claim 7, wherein substantially the entirety of said dispensing head is formed of said low surface free energy resin.

9. The combination of claim 1, including a removable closure cap for said container to cover said dispensing opening.

10. The combination of claim 1, wherein said low surface free energy resin is a fluorinated hydrocarbon polymer.

11. The combination of claim 1, wherein said cyanoacrylate resin is an α-cyanoacrylate resin.

12. A dispensing receptacle for an adhesive composition containing as its characteristic adhesion-producing component an cyanoacrylate monomer, said receptacle having an opening therein for dispensing said composition, the dispensing surfaces of said receptacle comprising a thermoplastic polymeric resin having a surface free energy which does not exceed about 35 dynes per cm.

13. The improvement of claim 12, wherein said monomer has the formula $$CH_2=C-C-OR$$
$$\phantom{CH_2=C-}|\phantom{-}\|$$
$$\phantom{CH_2=C-}CN\phantom{-}O$$

where R is a hydrocarbon radical of about 1–16 carbon atoms.

14. The improvement of claim 12 wherein said low surface free energy resin is a fluorinated hydrocarbon polymer.

References Cited
UNITED STATES PATENTS

| | | | |
|---|---|---|---|
| 2,663,461 | 12/1953 | Brown | 222—107 |
| 2,941,694 | 5/1960 | Harman | 222—107 |
| 2,965,964 | 12/1960 | Loew | 222—107 X |
| 3,239,105 | 3/1966 | Woodson | 222—107 X |

SAMUEL F. COLEMAN, Primary Examiner

H. S. LANE, Assistant Examiner

U.S. Cl. X.R.

222—192